Jan. 14, 1930.     D. C. BEIDLER ET AL     1,743,184
CAMERA AND CAMERA STAND
Original Filed April 20, 1927
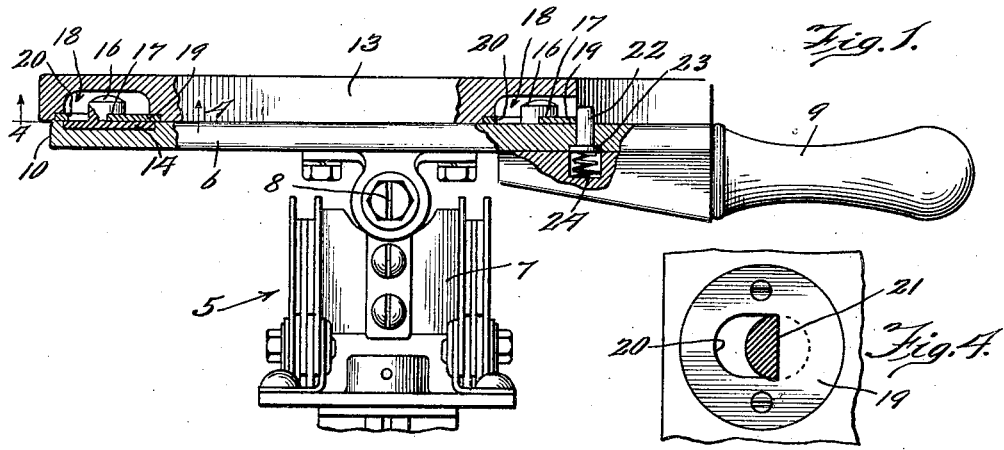
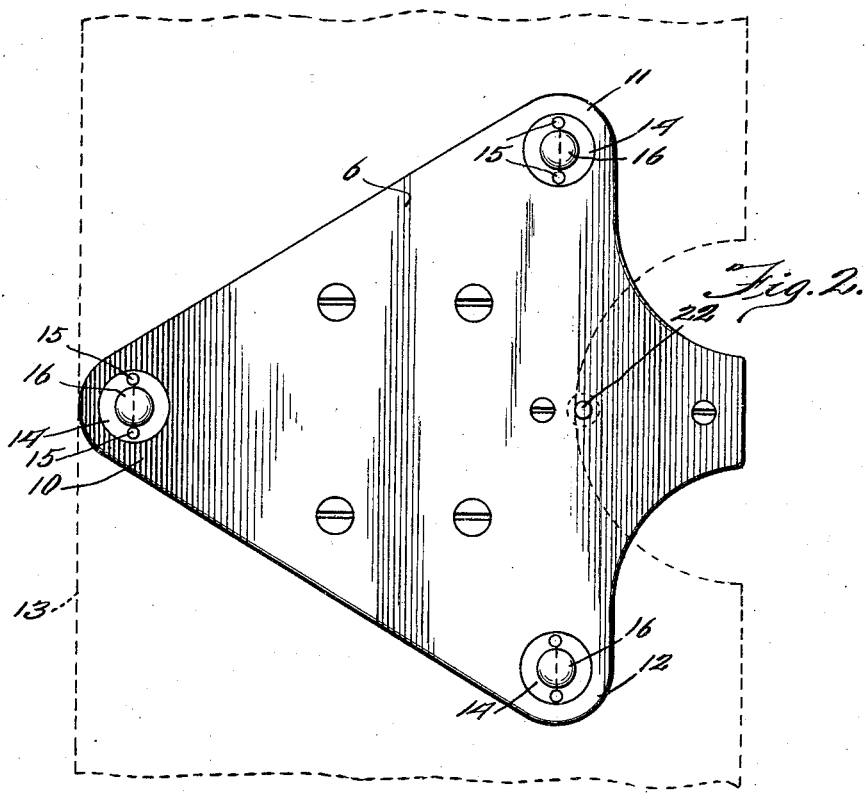
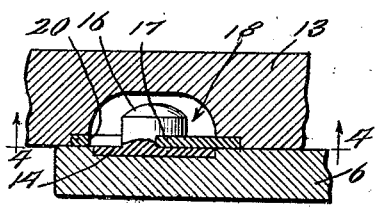
Inventors:
Donald C. Beidler
Antonius J. Viken
By Thos. A. Banning Jr.
atty.

Patented Jan. 14, 1930

1,743,184

UNITED STATES PATENT OFFICE

DONALD C. BEIDLER AND ANTONIUS J. VIKEN, OF CHICAGO, ILLINOIS, ASSIGNORS TO DONALD C. BEIDLER, TRUSTEE, OF CHICAGO, ILLINOIS

CAMERA AND CAMERA STAND

Original application filed April 20, 1927, Serial No. 185,179. Divided and this application filed March 16, 1928. Serial No. 262,200.

This invention has to do with certain improvements in the means for connecting cameras to the stands on which they are supported. The invention has reference particularly to improvements in the means for connecting portrait cameras to the stands; and has reference to an improved connecting means whereby the portrait cameras may be very quickly connected to or disconnected from the stands.

One object of the invention is to provide a connecting means which is so constructed that the base portion of the camera will be securely connected to the platform, and in a manner which will effectively retain the camera itself from shifting on the platform or being lifted away from the platform until the parts are properly disengaged.

This application is a division of our co-pending application for Letters Patent of the United States on Stands for cameras and the like, Serial No. 185,179, filed April 20, 1927. In that application we have disclosed a stand of such construction that it may be adjusted vertically with great facility, and will retain its adjusted position substantially under a condition of spring balance at all times. The stand is also so constructed that it can be very easily moved about from place to place during the operations of focusing and the like. The stand of that application is also provided with a handle or hand grip which can be very easily manipulated by the operator so as to adjust the position of the platform vertically, and also for tilting the platform about a horizontal axis, as well as for other movements. Inasmuch as during all of these evolutions it is necessary to retain the camera securely in position on the stand it is necessary to provide such securing means, which constitutes the subject matter of the present application.

Another object of the invention is to provide means whereby the camera base may be readily secured to the platform of the stand being a very simple movement which will cause the camera base to snap into place and be securely locked to the platform. Thereafter the camera can be released from the stand only by an intentional disengagement of this locking grip.

Other objects of the invention are to provide a construction such that the base portion of the camera may be made flush at all points so that there will be no projections to interfere with easy manipulation or use of the camera for other purposes.

Other objects and uses of the invention will appear from a detailed description of the same which consists of the features of construction and combinations of parts hereinafter described and claimed.

In the drawing:

Figure 1 shows a side elevation of the platform portion of the stand, with the base portion of the camera mounted thereon, certain parts being shown in vertical section for the purpose of illustrating the construction and co-operation;

Fig. 2 shows a top plan view of the platform with the camera removed;

Fig. 3 shows an enlarged vertical section through one of the locking connections whereby the base portion of the camera is connected to the platform; and Fig. 4 shows a horizontal fragmentary section on the line 4—4 of Fig. 3 looking in the direction of the arrows.

The upper portion of the stand is designated by the numeral 5. It carries a triangular shaped platform 6, preferably by a universal joint connection 7 which constitutes one of the features of the aforesaid parent application Serial No. 185,179. This universal joint connection includes a horizontal hinge axis 8 whereby the platform 6 may be rocked about a transverse axis substantially parallel to one of the sides of the triangular platform 6. Said platform is provided with an operating handle or hand grip 9 which is preferably extended from the center of the platform side which lies parallel to the horizontal axis 8. The point 10 of the platform opposite to the position of the hand grip 9 is the front of the platform and is directed towards the subject being photographed.

The platform 6 is also provided with the other triangular corners 11 and 12.

The base portion of the camera itself is designated by the numeral 13. Said base portion is shown by the dotted lines in Fig. 2 which represents the general outline of the base portion, when in place on the platform. The details of the camera construction constitute no portion of this application and therefore we do not consider it necessary to illustrate the same further.

At each corner of the platform 6 the same is provided with a fitting comprising a circular plate 14 which is set down into the top face of the platform so that its surface is flush therewith. Each of these fittings is secured in place in any convenient manner as by means of a screw 15 set in from above. Each of these fittings also includes a circular upstanding and relatively shallow lug 16, the back side of which is provided with a transverse notch 17. The notch 17 of each fitting has its bottom face flush with the top surface of the fitting 14, and each of said notches occupies substantially one half of the diameter of the lug 16 thereof.

Corresponding to each of the fittings 14 of the platform 6 there is in the bottom face of the camera base 13 a socket 18. Each of these sockets is of sufficient height to accommodate the corresponding lug 16 and of sufficient lateral dimensions to permit the camera base to be shifted a substantial distance back and forth without interference from the corresponding lug 16.

The lower face of each of the sockets 18 is protected by a plate 19 which is set up into the camera base and flush with the bottom surface thereof. Each of these plates 19 has a hole 20 of proper size to allow the lug 16 to be extended therethrough. At one side each of said holes 20 is straight as shown at 21 at Fig. 4, corresponding to the notch 17 of the corresponding lug 16.

Each of the holes 20 is large enough to allow the corresponding lug 16 to be extended through it so as to bring the bottom face of the camera base down flat against the top face of the platform 6. The parts are also so arranged that thereafter the camera base may be shifted laterally or forwardly so as to engage all of its plates 19 with the corresponding sockets 17 of the lugs 16 on the platform. In this manner the camera base is securely locked to the platform stand.

At one point I provide the platform 6 with a spring pressed pin 22 which has on its lower end an enlarged head 23. A spring 24 normally forces the pin up into the position of Fig. 1 so that the pin projects above the surface of the platform.

Preferably the pin and spring are located at or in line with the position of the handle 9 since the front end of said handle establishes additional vertical dimension to accommodate the pin and spring. This construction is shown in Fig. 1. The spring 24 is placed in a socket of sufficient depth to permit the pin to be pushed clear down flush with the surface of the platform. In the particular construction illustrated the spring 24 is of spiral form so that it can be fully collapsed in a relatively small space.

The pin 22 is located at such a position on the platform that if the camera base has been locked to the platform the pin may be projected forwardly at the back edge of the camera base so that thereafter the camera cannot be shifted backwardly without first depressing the pin. Consequently, if the camera has been set down onto the platform and then shifted so as to lock it to the platform the pin 22 will snap up and lock the camera base against disengagement. Such disengagement may afterwards be effected only at the wish of the operator and after purposely depressing the pin.

While we have herein shown and described only a single embodiment of the features of our present invention still we do not intend to limit ourselves thereto except as we may do so in the claim.

We claim:

In a device of the class described the combination of a suitable platform for the support of a camera, means for supporting said platform, a plurality of lugs extending above the surface of the platform, all of said lugs having notches immediately above the surface of the platform and all facing in the same being provided with companion sockets to receive said lugs, all of said sockets having lips facing in the same direction and oppositely to the direction of the notches of the lugs, whereby the camera may be set down onto the platform and then shifted sidewise to engage the lips with the notches of the lugs, and a suitable spring catch on the platform normally projecting above the surface thereof to engage the edge of the camera base when the same has been shifted sidewise to engage the lips with the notches of the lugs, substantially as described.

DONALD C. BEIDLER.
ANTONIUS J. VIKEN.